Sept. 24, 1929.  M. J. GILTNER  1,729,287
HOPPER FOR VENDING MACHINES
Original Filed Feb. 10, 1926   2 Sheets-Sheet 1
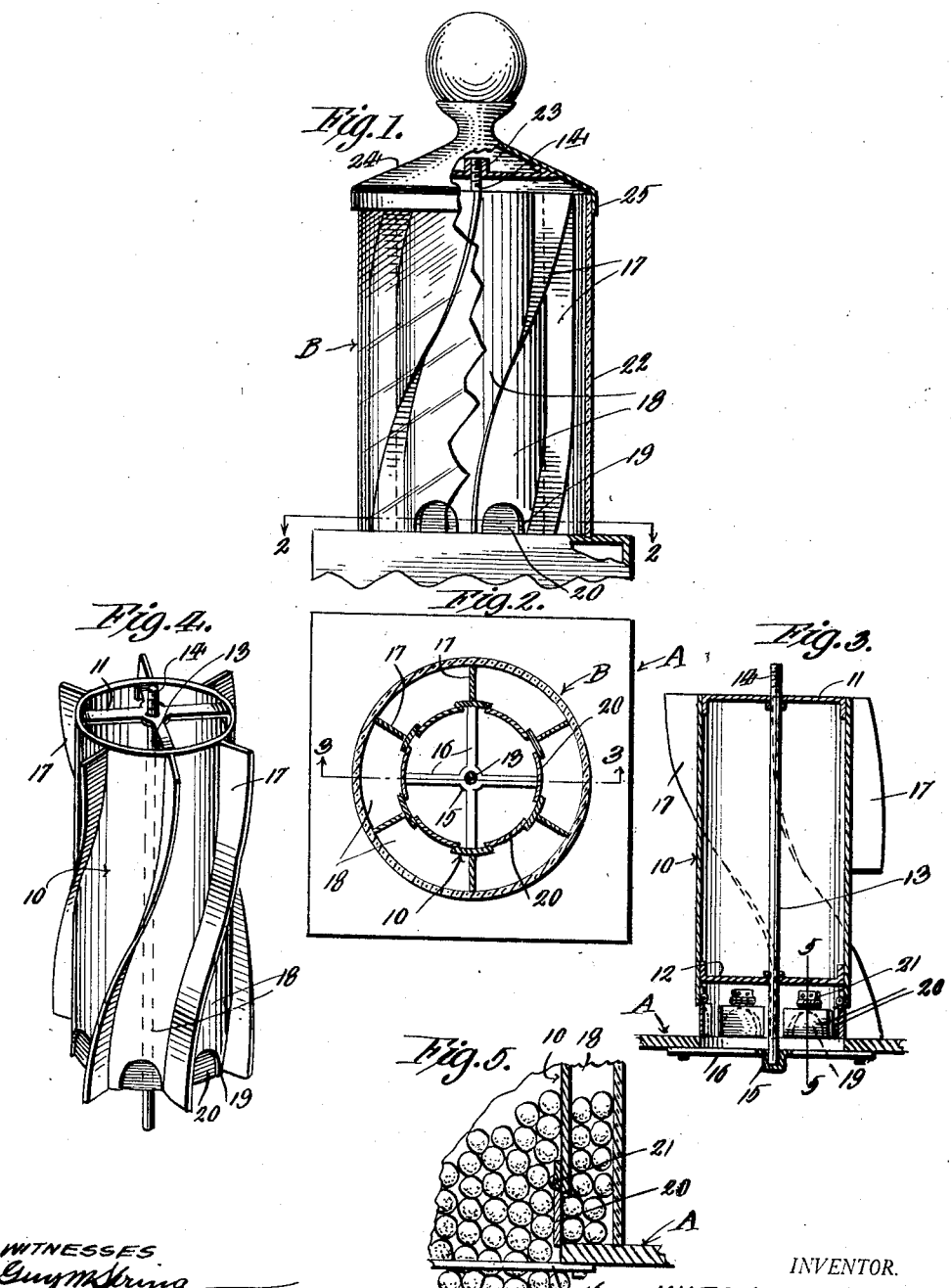
WITNESSES
INVENTOR.
MILTON J. GILTNER
BY
ATTORNEY.

Sept. 24, 1929.  M. J. GILTNER  1,729,287
HOPPER FOR VENDING MACHINES
Original Filed Feb. 10, 1926  2 Sheets-Sheet 2
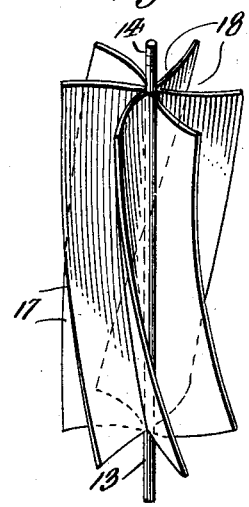
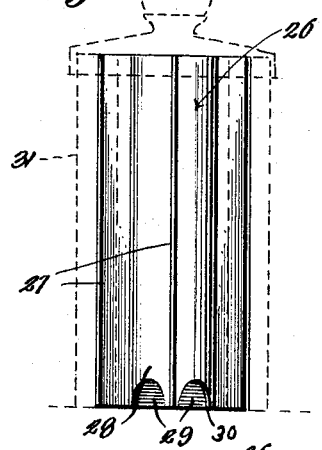
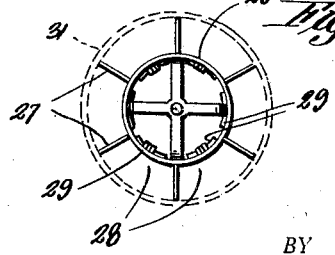
INVENTOR.
MILTON J. GILTNER
BY
ATTORNEY.

Patented Sept. 24, 1929

1,729,287

UNITED STATES PATENT OFFICE

MILTON J. GILTNER, OF OTTUMWA, IOWA

HOPPER FOR VENDING MACHINES

Application filed February 10, 1926, Serial No. 87,394. Renewed February 13, 1929.

This invention relates broadly to new and useful improvements in vending machines and has more specific reference to an improved hopper therefor.

An important object of the present invention is the provision of a novel and simplified construction of hopper so constructed that the articles to be vended will be clearly visible to the purchaser.

Another object of the present invention is to provide a hopper for vending machines having a large inner compartment and a plurality of outer compartments, each adapted to contain candy or the like to be vended and so arranged that the candy contained in the inner compartment will be vended before the candy in the outer compartments is disturbed.

Another object of the invention is to provide such a hopper for vending machines having a plurality of spirally arranged compartments each adapted to contain different colored candy balls or other desired confection, such as red, white, and blue, so that as the hopper is rotated, it will be given the appearance of a revolving barber pole.

Still another object of the invention is the provision of new and novel means for retaining the candy or other confection in the outer spiral compartments until the candy in the inner compartment has been entirely vended, said means also operating to automatically permit the candy in the outer spiral compartments to be vended as soon as the supply within the inner compartment has been exhausted.

A still further object of the present invention is the provision of such a hopper for vending machine which is simple in its construction, practical and efficient in its operation and an advance in the art.

With these and numerous other objects in view, the invention resides in the novel construction, combination, and arrangement of parts to be more fully hereinafter described, illustrated in the accompanying drawings and particularly pointed out in the appended claims.

In the drawings forming a part of this application and wherein like characters of reference denote corresponding parts throughout the several views:

Figure 1 is a front elevation, partially in section, of a hopper constructed in accordance with the present invention and showing the same applied to a vending machine.

Figure 2 is a transverse sectional view on line 2—2 of Figure 1.

Figure 3 is a sectional view on line 3—3 of Figure 2.

Figure 4 is a perspective view, of the cylinder constituting a part of the hopper.

Figure 5 is a sectional view on line 5—5 of Figure 3.

Figure 6 is a view, in elevation, of a modified form of the present invention.

Figure 7 is a view of still another modified form of the present invention.

Figure 8 is a top plan view of the modification shown in Figure 7 with the top thereof removed.

Referring more particularly to the accompanying drawings and especially to Figures 1 to 5 inclusive, the letter A indicates generally a portion of the base or body of a vending machine of any ordinary or preferred construction and B, the improved hopper therefor.

The hopper B comprises an elongated cylinder 10 having suitably secured to its inner surface the upper and lower cross arms or spiders 11 and 12 within which is secured the cylinder-supporting rod 13 projecting beyond the cylinder at both ends thereof, the upper end of the rod 13 being threaded as at 14 while the lower end thereof is adapted to be received within the bearing recess 15 formed in the cross piece or spider 16 carried by the top of the base or body A. While there has been shown one way in which the improved hopper may be supported upon the base A of the vending machine, it is to be understood that the invention is not to be limited to this particular supporting means in that various supporting means may be employed and in fact, depends upon the particular construction of the vending machine proper.

Secured to the outer surface of the cylinder 10 and projecting outwardly thereof are a plurality of blades 17 spirally arranged so that the upper end of each of said blades will be in substantial vertical alinement with the bottom of the adjacent blade, these blades acting as partitions to divide the cylinder into a plurality of spiral candy containing grooves or compartments 18, the lower end of each compartment being provided with an opening 19 communicating with the inside of the cylinder.

The openings 19 are adapted to be normally closed by means of the doors 20 hinged as at 21 directly thereabove and within the cylinder 10, these doors being arranged to be easily swung open upon the application of a slight pressure to the outer sides thereof.

The cylinder 10 is arranged to be enclosed within a somewhat larger outer cylinder 22 preferably made from glass or any other suitable transparent material, this outer cylinder 22 being of such a size that when the cylinder 10 is positioned therein, the partitions or blades 17 will be preferably spaced just a slight distance therefrom so as not to scrape thereagainst during the rotation thereof, this outer cylinder acting as the outer walls of the compartments 18. Threaded upon the upper end portion 14 of the cylinder supporting bar 13 as indicated at 23 is the ball cap or top 24, the lower end 25 thereof overlapping the upper end of the outer cylinder 22.

In the operation of the hopper, described hereinabove, both the inside of the cylinder 10 as well as the compartments or grooves 18 are first filled with candy balls or other confection, as shown in Figure 5. It will be noted that in the drawings there has been illustrated a cylinder provided with six outer spiral compartments 18 and in the preferred arrangement it is desired to fill these compartments with red, white, and blue candy balls. In other words, two of the compartments will contain red candy balls, two others will contain white candy balls and the other two blue candy balls. The colored balls will be arranged red, white and blue; red, white and blue, so that when the hopper is rotated, it will be given the appearance of a barber pole. Of course, while I have described the use of six compartments, any desired number may be used.

The candy within the cylinder 10 will be vended first and the pressure of this candy upon the doors 20 will retain them in closed position against the lesser force of the candy within the spiral compartments 18 until all of the candy within the cylinder has been vended. When the candy has been vended from the inside of the cylinder, the pressure of the candy within the spiral compartments 18 will cause the doors 20 to be swung open and the candy within the outer compartments will then be permitted to gravitate into the cylinders 10 and be vended out through the inside thereof.

This construction has been provided in order that the machine will not require frequent fillings and will give the correct appearance of a barber pole or the like until practically all the candy has been vended because, as already stated, the candy within the spiral compartments 18 will not be disturbed until all of the candy within the cylinder 10 has first been vended.

In Figure 6 wherein has been shown a slight modification of the present invention, the inner cylinder 10 has been dispensed with and instead, the spiral partitions or plates 17 are secured directly to the center bar 13 thus providing the several candy containing compartments 18 which when filled and rotated, will give the same appearance as will the preferred form of hopper described hereabove.

In Figures 7 and 8, is disclosed still another modification of the present invention and in this form there is provided a hollow cylinder 26 having secured to the outer surface thereof a plurality of plates 27 but instead of the plates being spirally arranged, they are vertically arranged. Each of the outer compartments 28 is provided at its lower end with an opening 30 in the rear of which is hingedly supported a door 29, this cylinder being positioned within the large outer cylinder 31 and being operated in exactly the same manner as that of the preferred form, the candy within the inner cylinder 26 being vended prior to the candy within the outer compartments.

From the above, it will be appreciated that there has been provided a hopper of the class described which will accomplish all of the objects and perform all of the functions enumerated as being desirable in the statement of the invention and that while there has been shown and described three ways in which the present invention may be carried into practice, it will be understood that the same is susceptible of modifications in various particulars and that the right is reserved to resort to any such modifications as properly fall within the scope of the appended claims without departing from or exceeding the spirit of the invention.

What is claimed is:

1. In a hopper for vending machines, an inner and an outer cylinder and a plurality of spirally arranged blades carried by the inner cylinder to form a plurality of confection containing compartments.

2. In a hopper for vending machines, an inner and an outer cylinder, and a plurality of spirally arranged blades carried by the inner cylinder and slightly spaced from the outer cylinder to provide a plurality of confection containing compartments, each of said outer compartments being in communication with the inner cylinder.

3. In a hopper for vending machines, an inner and an outer cylinder, a plurality of spirally arranged blades carried by the inner cylinder and slightly spaced from the outer cylinder to provide a plurality of confection containing compartments, each of said compartments having an opening therein communicating with the inner cylinder and means contained within said inner cylinder for closing the said openings.

4. In a hopper for vending machines, an inner cylinder and an outer cylinder, a plurality of spirally arranged blades carried by the outer surfaces of the inner cylinder and terminating immediately adjacent the said outer cylinder to form a plurality of confection containing compartments, each of which is provided at its lower end with an opening communicating with the inner cylinder, and a hinged door arranged within the rear of each opening and adapted to normally close the same.

5. In a vending machine hopper of the character described, a pair of cylinder bodies one within the other, said inner body being of materially less diameter than the outer body and designed to contain material to be dispensed, and a plurality of longitudinally extending blades carried upon the outer wall of the inner cylinder and spaced from the outer cylinder to provide a plurality of confection containing compartments, each of said outer compartments being in communication with the inner cylinder for the discharge of its contents thereinto after the inner cylinder has been emptied.

6. In a hopper for vending machines, a pair of hollow cylinders one within the other, said inner cylinder being of materially less diameter than the outer cylinder, a plurality of longitudinally extending blades carried upon the wall of the inner cylinder and spaced from the outer cylinder to provide a plurality of confection containing compartments, said inner cylinder at its lower portion being provided with a plurality of passage-ways through the wall thereof, each passage communicating with one of said compartments, and a shiftable closure member for each of said passage-ways.

7. In a hopper for vending machines, a pair of hollow cylinders one within the other, said inner cylinder being of materially less diameter than the outer cylinder, a plurality of longitudinally extending blades carried upon the wall of the inner cylinder and spaced from the outer cylinder to provide a plurality of confection containing compartments, said inner cylinder at its lower portion being provided with a plurality of passage-ways through the wall thereof, each passage communicating with one of said compartments, and a shiftable closure member for each of said passage-ways, each of said closure members being arranged to be maintained in closed position by material within the inner cylinder to prevent material contained in the outer compartment from passing therefrom until the inner cylinder is emptied.

In testimony whereof I affix my signature.

MILTON J. GILTNER.